(12) United States Patent
Kato

(10) Patent No.: US 11,105,656 B2
(45) Date of Patent: Aug. 31, 2021

(54) OPTICAL ENCODER USING TWO DIFFERENT WAVELENGTHS TO DETERMINE AN ABSOLUTE AND INCREMENTAL OUTPUT FOR CALCULATING A POSITION

(71) Applicant: MITUTOYO CORPORATION, Kanagawa (JP)

(72) Inventor: Yoshiaki Kato, Chiba (JP)

(73) Assignee: MITUTOYO CORPORATION, Kanagawa (JP)

(*) Notice: Subject to any disclaimer, the term of this patent is extended or adjusted under 35 U.S.C. 154(b) by 77 days.

(21) Appl. No.: 16/811,420

(22) Filed: Mar. 6, 2020

(65) Prior Publication Data
US 2020/0319001 A1 Oct. 8, 2020

(30) Foreign Application Priority Data
Apr. 3, 2019 (JP) .............................. JP2019-071201

(51) Int. Cl.
*G01D 5/347* (2006.01)

(52) U.S. Cl.
CPC ......... *G01D 5/34715* (2013.01); *G01D 5/347* (2013.01); *G01D 5/34746* (2013.01); *G01D 5/34792* (2013.01)

(58) Field of Classification Search
CPC ........... G01D 5/34715; G01D 5/34746; G01D 5/34792; G01D 5/347
See application file for complete search history.

(56) References Cited

U.S. PATENT DOCUMENTS

| 5,279,044 A | 1/1994 | Bremer | |
|---|---|---|---|
| 2007/0187582 A1* | 8/2007 | Chin | G01D 5/34792 250/231.13 |
| 2008/0099666 A1* | 5/2008 | Masada | G01D 5/34707 250/226 |
| 2009/0316155 A1* | 12/2009 | Yaku | G01D 5/34792 356/445 |
| 2019/0250013 A1* | 8/2019 | Kim | G01D 5/34792 |

FOREIGN PATENT DOCUMENTS

| JP | 05-71984 A | 3/1993 |
|---|---|---|
| JP | 2013-79915 A | 5/2013 |

* cited by examiner

*Primary Examiner* — Jennifer D Bennett
(74) *Attorney, Agent, or Firm* — Greenblum & Bernstein, P.L.C.

(57) ABSTRACT

Scale pattern in a scale of an optical encoder includes a first scale mark that blocks a first light from being guided to an image capturer and guides a second light to the image capturer, and a second scale mark that guides the first light and the second light to the image capturer. Second scale mark is arranged in an ABS pattern and the first scale mark is arranged in an INC pattern by incorporating the second scale mark. Image capturer includes a first image capturing section that captures an image of the ABS pattern from the first light that arrives via the second scale mark, and a second image capturing section that captures an image of the INC pattern from the second light that arrives via the first scale mark and the second scale mark. Calculator calculates a position of a head relative to the scale.

16 Claims, 8 Drawing Sheets

OPTICAL ENCODER USING TWO DIFFERENT WAVELENGTHS TO DETERMINE AN ABSOLUTE AND INCREMENTAL OUTPUT FOR CALCULATING A POSITION

CROSS-REFERENCE TO RELATED APPLICATIONS

The present application claims priority under 35 U.S.C. § 119 of Japanese Application No. 2019-071201, filed on Apr. 3, 2019, the disclosure of which is expressly incorporated by reference herein in its entirety.

BACKGROUND OF THE INVENTION

1. Field of the Invention

The present invention relates to an optical encoder.

2. Description of Related Art

Conventionally, an optical encoder is known which includes a scale having a scale pattern provided along a measurement direction, a head that faces the scale and displaces relative to the scale along the measurement direction, and a calculator that calculates a signal that is based on the relative displacement between the scale and the head. The head includes a light source that emits light at the scale, and an image capturer that captures an image of the light that arrives from the light source via the scale pattern.

In this example, as a method of detecting an amount of the relative displacement between the scale and the head, an incremental method (hereafter, referred to as an INC method) and an absolute method (hereafter, referred to as an ABS method) are known for optical encoders. The INC method is a method detecting a relative position by continuously detecting an incremental pattern which is a scale pattern having scale marks arranged on a scale at a constant pitch (hereafter, referred to as an INC pattern) and conducting a count-down or a count-up of the number of detected scale marks of the INC pattern. The ABS method is a method where an absolute pattern which is a scale pattern having scale marks arranged on a scale randomly (hereafter, referred to as an ABS pattern) is detected at a proper timing and the ABS pattern is analyzed in order to detect an absolute position.

In the ABS method, there is a method detecting the absolute position from the ABS pattern captured by the image capturer, for example, by arranging the scale marks of the ABS pattern over the entire length of the scale of the optical encoder based on a maximum length sequence code (two-leveled pseudorandom code). With this method noted above, a long ABS pattern can be designed. However, because there are fewer scale marks configuring the scale pattern than in the INC pattern, detection accuracy may not be as good as in the INC method.

In contrast, an encoder described in Japanese Patent Laid-open Publication No. 2013-79915 uses both INC and ABS detection methods to improve detection accuracy. The encoder includes a scale of a double track type provided with an incremental track that has the INC pattern (hereafter, referred to as an INC track) and an absolute track that has the ABS pattern (hereafter, referred to as an ABS track). The light is emitted from the light source of the detection head (head) toward the INC track and ABS track, the light that arrives via each track is respectively received by a photo-receiver element (image capturer) to detect the INC pattern and ABS pattern, and the encoder calculates position information based on each of the patterns. However, when the double track type is used, due to the head attitude and undulations in the scale, errors may arise in the position information of the INC track and ABS track and may affect the detection results. In addition, in order to inhibit such issues, errors in the position information of the INC track and ABS track need to be corrected.

To address the issue mentioned above, an absolute position measuring apparatus (optical encoder) described in Japanese Patent Laid-open Publication No. H5-71984 uses a single compound track composed of the incremental track (INC track) and the absolute track (ABS track) to detect the position information. Accordingly, the absolute position measuring apparatus inhibits errors from arising in the position information of the INC track and ABS track due to the head attitude and undulations in the scale. Further, the absolute position measuring apparatus treats the INC track and ABS track as a single track, and so the number of tracks can be reduced and the device can be made smaller.

However, when the single compound track composed of the INC track and ABS track (such as in the absolute position measuring apparatus described in Japanese Patent Laid-open Publication No. H5-71984) is used, the INC pattern may be an incomplete INC pattern with omitted scale marks. Accordingly, compared to when the conventional INC pattern is used, accurate detection may be compromised.

SUMMARY OF THE INVENTION

The present invention provides an optical encoder that, configures a single compound track of an absolute pattern and incremental pattern with no omitted scale marks, and enables improvement in detection accuracy of position information.

An optical encoder according to the present invention is an optical encoder that includes a scale having a scale pattern provided along a measurement direction, a head that faces the scale and displaces relative to the scale along the measurement direction, and a calculator that calculates a signal that is based on the relative displacement between the scale and the head, and the head includes a light source that emits light at the scale, and an image capturer that captures an image of the light from the light source that arrives via the scale pattern. The light emitted from the light source includes a first light that is light of a predetermined wavelength and a second light that is light of a wavelength other than that of the first light. The scale pattern includes a first scale mark that blocks the first light from being guided to the image capturer and guides the second light to the image capturer, and a second scale mark that differs from the first scale mark and guides the first light and the second light to the image capturer. The second scale mark is arranged along the measurement direction so as to form an absolute pattern that expresses an absolute position, and the first scale mark is arranged along the measurement direction so as to form an incremental pattern that expresses a relative position by incorporating the absolute pattern created by the second scale mark to combine the first scale mark and the second scale mark. The image capturer includes a first image capturing portion that captures an image of the absolute pattern configured by the first light that arrives via the second scale mark, and a second image capturing portion that captures an image of the incremental pattern configured by the second light that arrives via the first scale mark and the second scale mark. The calculator includes an absolute signal generator that generates an absolute signal from the absolute pattern captured by the first image capturing portion, an incremental signal generator that generates an incremental signal from the incremental pattern captured by the second image capturing portion, and a position calculator that calculates a position of the head relative to the scale from the absolute signal and the incremental signal.

According to the present invention, the first scale mark guides the second light to the image capturer, and the second scale mark guides the first light and the second light to the image capturer. The second scale mark is arranged along the measurement direction so as to form the absolute pattern that expresses the absolute position, and the first scale mark is arranged along the measurement direction so as to form the incremental pattern that expresses the relative position by incorporating the absolute pattern created by the second scale mark to combine the first scale mark and the second scale mark, and therefore, the absolute pattern is expressed by the first light and the incremental pattern is expressed by the second light. The first image capturing portion captures the image of the absolute pattern configured by the first light that arrives via the second scale mark, and the second image capturing portion captures the image of the incremental pattern configured by the second light that arrives via the first scale mark and the second scale mark. In addition, the calculator includes the absolute signal generator that generates the absolute signal from the absolute pattern captured by the first image capturing portion, and the incremental signal generator that generates the incremental signal from the incremental pattern captured by the second image capturing portion, and the calculator uses the position calculator to calculate the position of the head relative to the scale from the absolute signal and the incremental signal.

In this example, an ABS method is used that calculates an absolute position by analyzing pseudorandom code which is a combination of "1s" and "0s" in a signal consisting of a plurality of "1s" and "0s," for example. Depending on an analysis method and a type of code, examples of the pseudorandom code include the maximum length sequence code, Gold sequence code, and Barker sequence code. In the ABS method, the scale pattern is arranged, over the entire length of a single track, so as to express the absolute position according to the pseudorandom code. The signal consisting of the plurality of "1s" and "0s" is obtained from an image captured by the image capturer all at once from the scale pattern, and the combinations of "1s" and "0s" in the signal differ from each other at each position on the single track. Therefore, the optical encoder can calculate the absolute position of the head relative to the scale by analyzing the combinations of "1s" and "0s" in the signal consisting of the plurality of "1s" and "0s." The absolute signal generator generates an absolute signal by analyzing the combinations of "1s" and "0s" in the signal consisting of the plurality of "1s" and "0s" (for example, the first light is defined as "1" and the second light is defined as "0").

Therefore, the optical encoder includes the first scale mark that blocks the first light from being guided to the image capturer and guides the second light to the image capturer, and the second scale mark that guides the first light and the second light to the image capturer; and further includes the first image capturing portion that captures the image of the absolute pattern configured by the first light and the second image capturing portion that captures the image of the incremental pattern configured by the second light, thereby making it possible to obtain both the absolute signal and the incremental signal and to calculate the position of the head relative to the scale with the single track. Accordingly, the optical encoder can improve detection accuracy of position information while configuring the single compound track of the absolute pattern and the incremental pattern with no omitted scale marks. Further, the optical encoder can be made smaller and reduce costs because there is no need for a separate track for each of the absolute pattern and the incremental pattern.

At this time, it is preferred that the first scale mark blocks the first light from being guided to the image capturer by absorbing the first light and guides the second light to the image capturer.

With such a configuration, the first scale mark absorbs the first light without causing reflection or refraction, for example, and therefore the first light can be reliably blocked from being guided to the image capturer. Accordingly, the optical encoder can improve detection accuracy.

At this time, the first scale mark preferably has a structure formed by nanoimprinting, where the structure blocks the first light from being guided to the image capturer and guides the second light to the image capturer.

In this example, there is light of a wavelength having a characteristic where, when a predetermined nano-pattern is interposed, the light is absorbed by the nano-pattern. In addition, nanoimprinting (nanoimprint) is a technology in the field of semiconductors for transferring a nano-pattern by pressing an original plate engraved with the nano-pattern to a substrate. According to the configuration of the present invention, a nano-pattern is formed in the first scale mark by nanoimprinting, the nano-pattern having a structure that blocks the first light from being guided to the image capturer and guides the second light to the image capturer, and the first light is the light of the wavelength having the characteristic where, when the predetermined nano-pattern is interposed, the light is absorbed by the nano-pattern. Therefore, it is possible to readily form the first scale mark that can block the first light from being guided to the image capturer. In addition, because the nano-pattern is formed in the first scale mark using nanoimprinting, the nano-pattern can be formed by transferring without using an exposure apparatus. Accordingly, the present invention can reduce costs.

At this time, the second image capturing portion preferably captures images by offsetting the image capture timing from when the first image capturing portion captures images.

With such a configuration, the second image capturing portion can capture images of the absolute pattern and the incremental pattern using a single image capturer, for example, by offsetting the image capture timing from when the first image capturing portion captures images. Accordingly, the optical encoder can reduce costs.

At this time, the light source preferably includes a first light source that emits light of the predetermined wavelength at the scale and a second light source that emits light of a wavelength other than the predetermined wavelength at the scale.

With such a configuration, the light source includes the first light source emitting the light of the predetermined wavelength at the scale and the second light source emitting the light of the wavelength other than the predetermined wavelength at the scale, and thereby the image capturer can capture images of the incremental pattern and the absolute pattern separately, for example. In addition, the first image capturing portion can capture an image of the absolute pattern and the second image capturing portion can capture an image of the incremental pattern reliably at a respective predetermined timing.

BRIEF DESCRIPTION OF THE DRAWINGS

The present invention is further described in the detailed description which follows, in reference to the noted plurality of drawings by way of non-limiting examples of exemplary embodiments of the present invention, in which like reference numerals represent similar parts throughout the several views of the drawings, and wherein.

DETAILED DESCRIPTION OF THE INVENTION

The particulars shown herein are by way of example and for purposes of illustrative discussion of the embodiments of the present invention only and are presented in the cause of providing what is believed to be the most useful and readily understood description of the principles and conceptual aspects of the present invention. In this regard, no attempt is made to show structural details of the present invention in more detail than is necessary for the fundamental understanding of the present invention, the description taken with the drawings making apparent to those skilled in the art how the forms of the present invention may be embodied in practice.

First Embodiment

Figure 1:
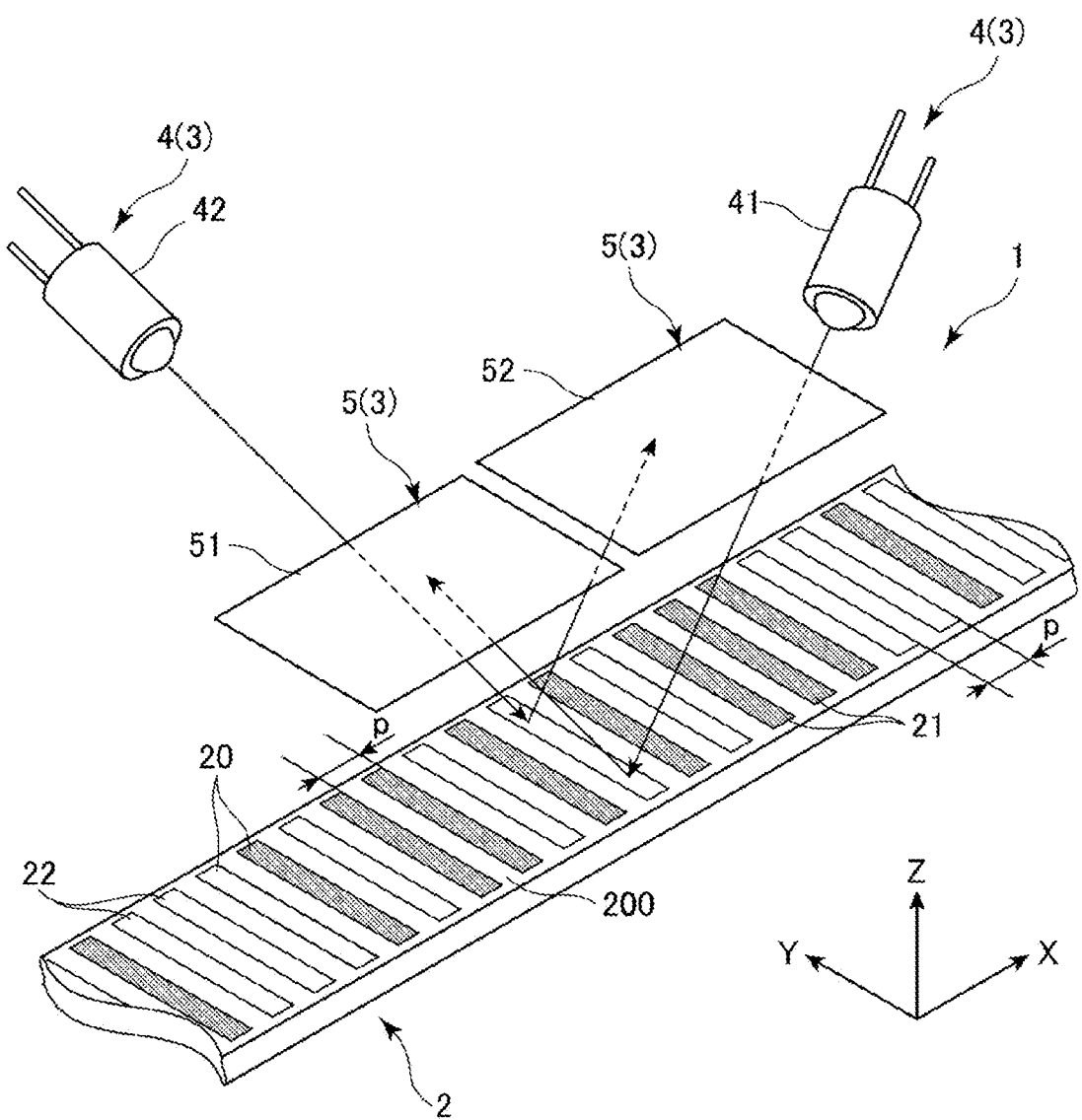
FIG. 1 is a perspective view of an optical encoder according to a first embodiment of the present invention.

Hereafter, a first embodiment of the present invention is described with reference to FIGS. 1 to 5. In each of the drawings, a long direction of a scale 2 of an optical encoder 1 is illustrated as the X direction, a short direction is illustrated as the Y direction, and a height direction is illustrated as the Z direction. Hereafter, descriptions may be provided simply using the terms X direction, Y direction, and Z direction. FIG. 1 is a perspective view of the optical encoder 1 according to the first embodiment of the present invention.

As illustrated in FIG. 1, the optical encoder 1 includes the long scale 2 and a head 3 that faces the scale 2 and displaces relative to the scale 2 along the X direction (measurement direction). The optical encoder 1 is a linear encoder used in a linear scale, which is a measuring device not shown in the drawings. The optical encoder 1 is provided inside the linear scale. The linear scale detects a position of the head 3 relative to the scale 2 by displacing the head 3 relative to the scale 2 along the X direction (measurement direction), and outputs the detection results to a display component such as a liquid crystal display, which is not shown in the drawings. The head 3 includes a light source 4 which emits light toward the scale 2, and an image capturer 5 which captures an image of the light from the light source 4 that arrives via the scale 2. The head 3 is provided so as to be capable of advancing and retreating in the X direction relative to the scale 2. The light source 4 and the image capturer 5 are configured so as to displace integrally relative to the scale 2.

The scale 2 is formed with glass, for example, and is provided with a periodic scale pattern 20 that is provided along the X direction (measurement direction) on one surface. The scale pattern 20 is a reflective type. The scale pattern 20 is a reflecting portion that reflects the light from the light source 4. A base 200 of the scale 2, which is a portion that is not provided with the scale pattern 20, is a non-reflecting portion that does not reflect the light. The scale pattern 20 includes a first scale mark 21 and a second scale mark 22, and the first scale mark 21 and the second scale mark 22 are arrayed in parallel along the X direction at a predetermined pitch p.

The light source 4 emits the light at the scale 2, the light having a first light that is light of a predetermined wavelength and the second light that is light of a wavelength other than that of the first light. The light source 4 includes a first light source 41 that emits the first light at the scale 2 and a second light source 42 that emits the second light at the scale 2. The first light is infrared light that is light of a specific wavelength $\lambda$, for example, and the first light source 41 is an infrared light source that emits light of the specific wavelength $\lambda$. The second light is light of a wavelength other than the specific wavelength $\lambda$, and the second light source 42 is a light emitting diode (LED), for example. The first light source 41 and the second light source 42 are installed at appropriate angles for emitting light at the scale 2. The first light source 41 may be any light source that is capable of emitting the light of the predetermined wavelength. The second light source 42 is not limited to the LED and an arbitrary light source that is capable of emitting the light of the wavelength that differs from that of the first light source 41 may instead be employed.

A photo diode array (PDA) is employed as the image capturer 5 (also referred to as a camera, imager, image detector, detector and/or an imaging device). The image capturer 5 is not limited to a PDA, and may use any suitable detection device such as a position sensitive detector (PSD), a Complementary Metal Oxide Semiconductor (CMOS) sensor, a charge-coupled device (CCD) and the like. The image capturer 5 includes a first image capturing portion 51 (also referred to as first image capturing region, area, element and/or section) that captures an image of an absolute pattern (scale pattern 20) configured by the first light that arrives via the second scale mark 22, and a second image capturing portion 52 (also referred to as second image capturing region, area, element and/or section) that captures an image of an incremental pattern (scale pattern 20) configured by the second light that arrives via the first scale mark 21 and the second scale mark 22. The relationships between the first scale mark 21 and the second scale mark 22, and between the absolute pattern and the incremental pattern, are described later.

The image capturer 5 is installed facing a +Z direction (upper side on the plane of the drawing sheet) of the scale 2 so as to overlap with the scale 2. The first image capturing portion 51 and the second image capturing portion 52 are arrayed in parallel in the X direction (measurement direction). In other words, the first image capturing portion 51 is arranged at a position where the image of the light from the first light source 41 that arrives via the scale 2 can be captured, and the second image capturing portion 52 is arranged at a position where the image of the light from the second light source 42 that arrives via the scale 2 can be captured. The first image capturing portion 51 and the second image capturing portion 52 may also be arrayed in parallel in the Y direction or be arranged offset from each other in the Z direction as long as the first image capturing portion 51 can capture the image of the light from the first light source 41 and the second image capturing portion 52 can capture the image of the light from the second light source 42. How the first image capturing portion 51 and the second image capturing portion 52 are arranged in the head 3 is a design matter.

Figure 2A:
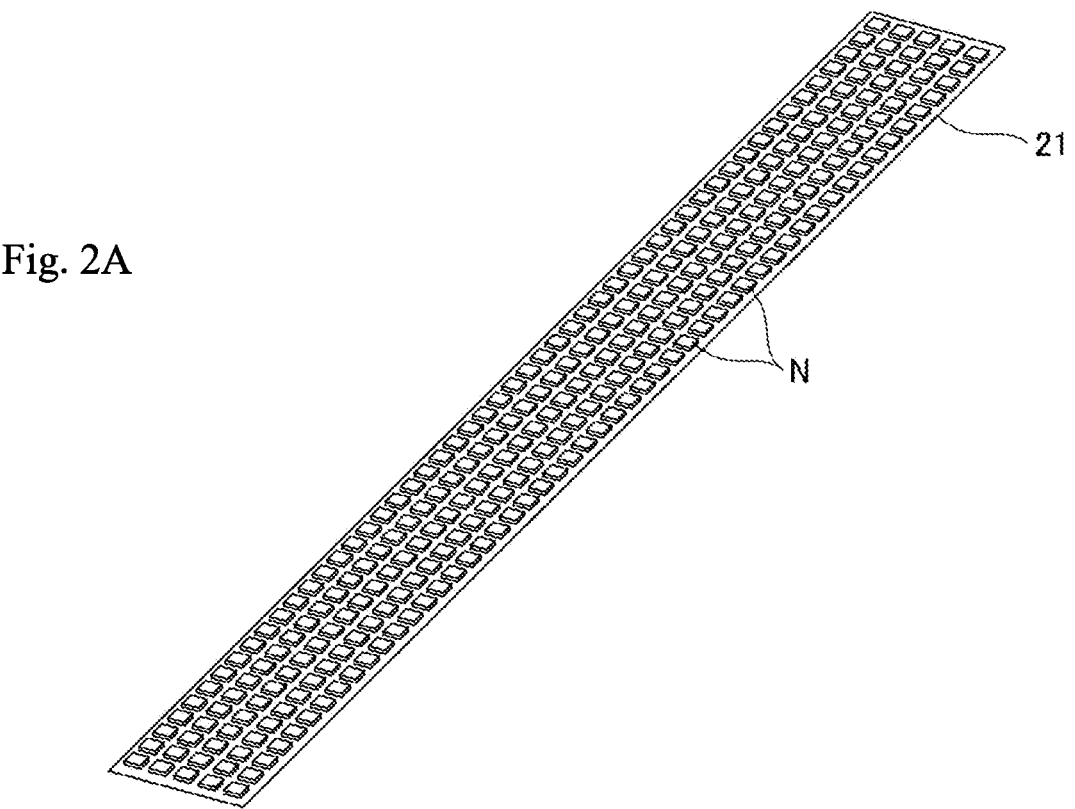
FIGS. 2A and 2B are perspective views illustrating a first scale mark and a second scale mark of the optical encoder.
Figure 2B:
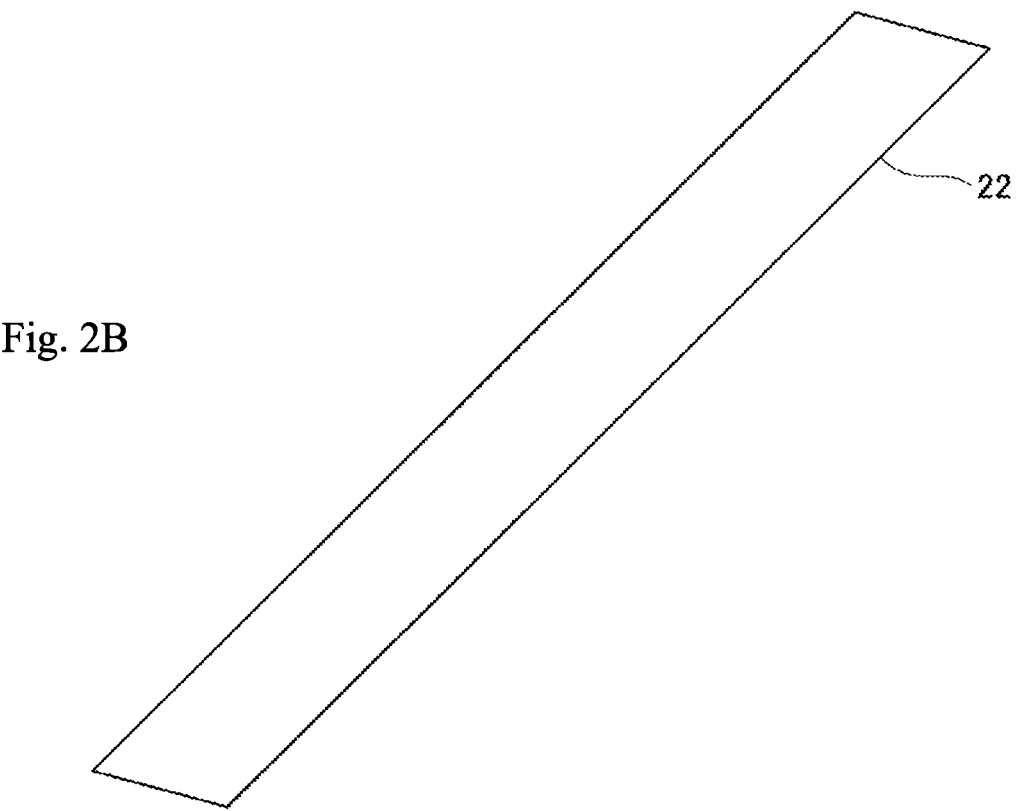

FIGS. 2A and 2B are perspective views illustrating the first scale mark 21 and the second scale mark 22 of the optical encoder 1. Specifically, FIG. 2A is a perspective view of the first scale mark 21 and FIG. 2B is a perspective view of the second scale mark 22. The first scale mark 21 blocks the first light from being guided to the image capturer 5 and guides the second light to the image capturer 5. As shown in FIG. 2A, the first scale mark 21 is formed with a nano-pattern N having tiny uneven structures. The nano-pattern N is formed by nanoimprinting. The nano-pattern N has a characteristic of absorbing the light of the specific wavelength $\lambda$ that is included in the light emitted by the light source 4. Specifically, through calculation based on electromagnetic optics, the nano-pattern N has a configuration with a characteristic of absorbing the light of the specific wavelength $\lambda$ by Mie resonance.

Therefore, in the present embodiment, a description is given in which the light of the specific wavelength $\lambda$ that is absorbed by the nano-pattern N is defined as the first light and the light of a wavelength other than the specific wavelength $\lambda$ is defined as the second light. The first scale mark 21 is, for example, a metal film that reflects light. The first scale mark 21 absorbs the first light with the nano-pattern N while reflecting the second light and guiding the second light to the image capturer 5. The second scale mark 22 is, for example, a metal film that reflects light, and has no nano-pattern N such as provided on the first scale mark 21 as shown in FIG. 2B. Since the second scale mark 22 has no nano-pattern N, the second scale mark 22 guides light to the image capturer 5 by reflecting the first light and the second light without absorbing the first light. The first scale mark 21 and the second scale mark 22 need not be a metal film and may be any component that is capable of reflecting light.

Figure 3:
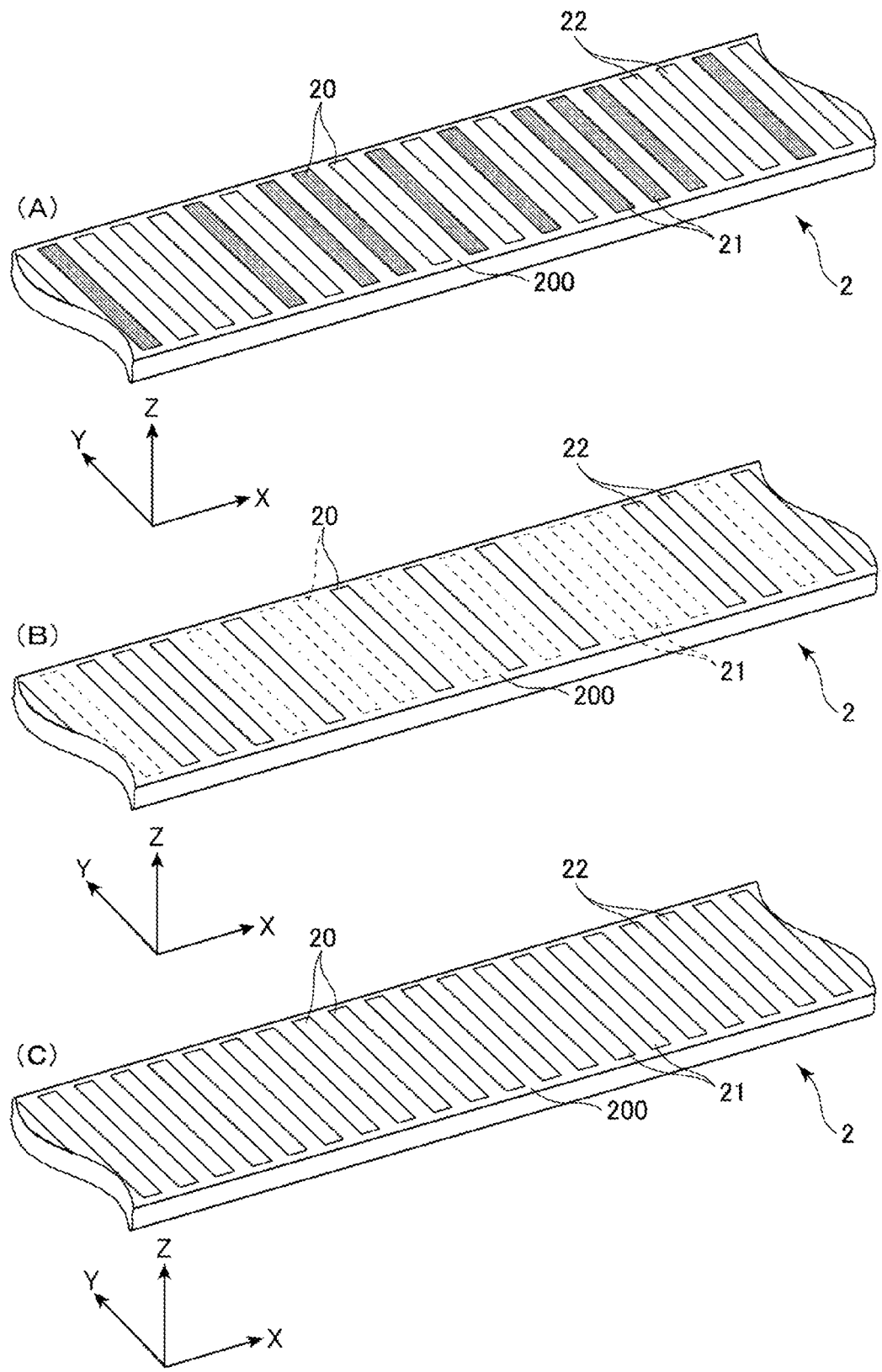
FIG. 3 is a perspective view illustrating a scale pattern of the optical encoder.

FIG. 3 is a perspective view illustrating the scale pattern 20 of the optical encoder 1. Specifically, (A) in FIG. 3 shows an appearance of the first scale marks 21 and the second scale marks 22, (B) in FIG. 3 shows the scale pattern 20 that is captured by the first image capturing portion 51, and (C) in FIG. 3 shows the scale pattern 20 that is captured by the second image capturing portion 52. As shown in (A) of FIG. 3, the second scale marks 22 are arranged along the X direction (measurement direction) so as to form an absolute pattern (ABS pattern) that expresses absolute positions in the scale pattern 20. The first scale marks 21 are arranged along the X direction (measurement direction) so as to form an incremental pattern (INC pattern) that expresses relative positions in the scale pattern 20 by incorporating the ABS pattern created by the second scale marks 22 to combine the first scale marks 21 and the second scale marks 22.

Specifically, as shown in (B) of FIG. 3, for the first scale marks 21 and the second scale marks 22 that are arranged at the predetermined pitch p, the ABS pattern defines the first scale marks 21 as a non-reflecting portions that absorb the first light (light of the specific wavelength $\lambda$), and the second scale marks 22 as reflecting portions that reflect the first light. Accordingly, when the first light of the specific wavelength $\lambda$ is emitted, the first light is reflected only by the second scale marks 22. For example, when the first scale marks 21 are defined as "0" and the second scale marks 22 as "1," the first scale marks 21 and the second scale marks 22 are arranged along the X direction, over an entire length of the scale 2, so as to form the ABS pattern that expresses absolute positions according to the maximum length sequence code (pseudorandom code).

The first image capturing portion 51 captures an image of the maximum length sequence code (pseudorandom code) from the first light as the ABS pattern. The maximum length sequence code is the code that has the longest periodicity compared to other codes in the sequence generated from the signals of "0" and "1" captured by the first image capturing portion 51 (image capturer 5). Accordingly, the first scale marks 21 and the second scale marks 22 that are arranged to express the absolute position according to the maximum length sequence code can form a scale pattern 20 that is longer than those where another pseudorandom code is employed.

As shown in (C) of FIG. 3, the INC pattern defines the first scale marks 21 and the second scale marks 22 as reflecting portions that reflect the second light (light of a wavelength other than the specific wavelength $\lambda$) and defines the base 200 of the scale 2 as a non-reflecting portion. Accordingly, the second light reflected via the first scale marks 21 and the second scale marks 22 is captured as the INC pattern by the second image capturing portion 52.

Figure 4:
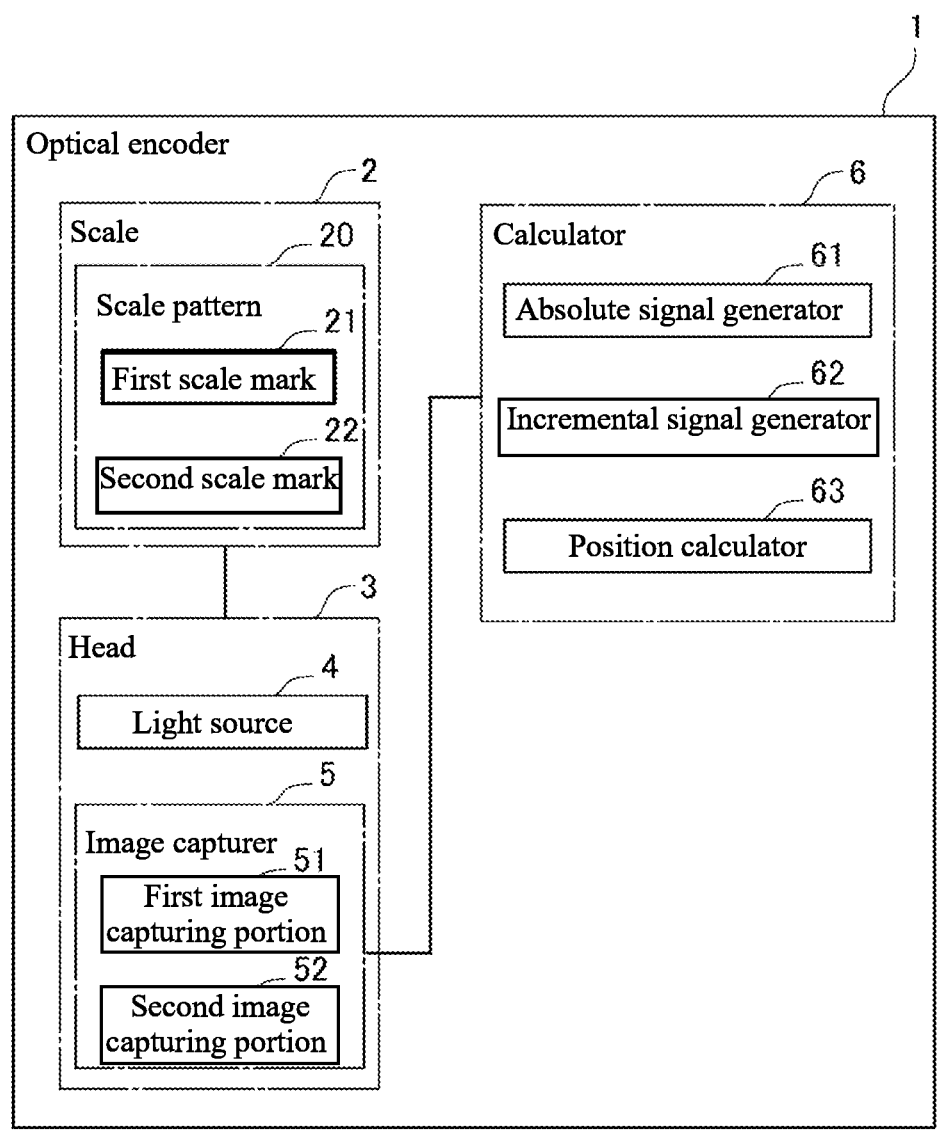
FIG. 4 is a block diagram illustrating the optical encoder.

FIG. 4 is a block diagram illustrating the optical controller 1. As shown in FIG. 4, the optical encoder 1 further includes a calculator 6 that calculates a signal that is based on the relative displacement between the scale 2 and the head 3. The calculator 6 includes an absolute signal generator 61, an incremental signal generator 62, and a position calculator 63. The calculator 6 is a microcomputer, for example. The absolute signal generator 61 generates an absolute signal (ABS signal) from the ABS pattern captured by the first image capturing portion 51. The incremental signal generator 62 generates an incremental signal (INC signal) from the INC pattern captured by the second image capturing portion 52. The position calculator 63 calculates the position of the head 3 relative to the scale 2 from the ABS signal and the INC signal.

Figure 5:
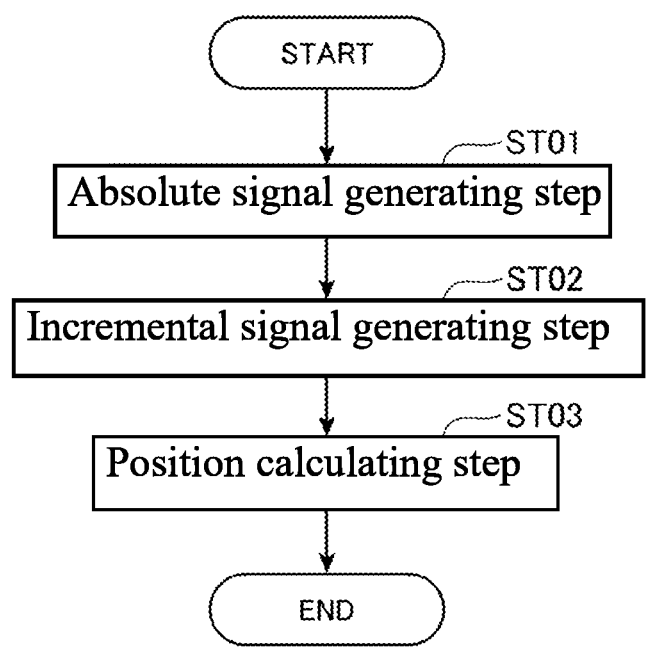
FIG. 5 is a flow chart of a method for calculating a position of the optical encoder.

FIG. 5 is a flow chart of a position calculation method for the optical encoder 1.

Hereafter, the method for calculating the position of the head 3 relative to the scale 2 of the optical encoder 1 is described based on FIG. 5. First, the image capturer 5 captures an image of the light from the light source 4 that arrives via the scale pattern 20. Specifically, the first image capturing portion 51 captures the image of the ABS pattern formed by the first light (light of the specific wavelength $\lambda$) reflected by the second scale marks 22 and the second image capturing portion 52 captures the image of the INC pattern formed by the second light (light of a wavelength other than the specific wavelength $\lambda$) reflected by the first scale marks 21 and the second scale marks 22.

Next, as shown in FIG. 5, the absolute signal generator 61 performs an absolute signal generating step that generates the ABS signal from the ABS pattern captured by the first image capturing portion 51 (step ST01). In the method for generating the ABS signal, for example, the first image capturing portion 51 captures the image of the first light that has arrived via eight of the first scale marks 21 and the second scale marks 22. The absolute signal generator 61 generates a signal consisting of binary pattern "01110100" from the left of the drawing plane as shown in (B) of FIG. 3, for example. When the head 3 is displaced relative to the scale 2 toward the +X direction (right side of the drawing plane), the absolute signal generator 61 generates a signal having a different code such as "11101001" and "11010010" each time the head 3 moves by the amount of a single scale mark of the first scale marks 21 or the second scale marks 22.

Further, the incremental signal generator 62 performs an incremental signal generating step that generates the INC signal from the INC pattern created by the second light captured by the second image capturing portion 52 (step ST02). At this time, the incremental signal generator 62 performs the incremental signal generating step by offsetting the timing for performing the step from when the absolute signal generating step is performed by the absolute signal generator 61 (step ST02). In the first embodiment, the first image capturing portion 51 is arranged corresponding to the first light source 41 and the second image capturing portion 52 is arranged corresponding to the second light source 42, and therefore, the incremental signal generator 62 may also perform the incremental signal generating step at the same time as the absolute signal generating step is being performed by the absolute signal generator 61.

Next, the position calculator 63 performs the position calculating step that calculates the position of the head 3 relative to the scale 2 based on the ABS signal generated in the absolute signal generating step and the INC signal generated in the incremental signal generating step (step ST03). Accordingly, the optical encoder 1 can suppress errors in the position information of the INC track and the ABS track that are due to the attitude of the head 3 and undulations of the scale 2 and can calculate the position of the head 3 relative to the scale 2 with a single track and achieve similar detection accuracy as in a double track system.

According to the first embodiment noted above, the following effects and advantages can be achieved.

(1) The optical encoder 1 includes the first scale mark 21 that blocks the first light from being guided to the image capturer 5 and reflects the second light to the image capturer 5, and the second scale mark 22 that reflects the first light and the second light to the image capturer 5; and further includes the first image capturing portion 51 that captures the image of the absolute pattern configured by the first light, and the second image capturing portion 52 that captures the image of the incremental pattern configured by the second light, thereby making it possible to obtain both the absolute signal and the incremental signal and to calculate the position of the head 3 relative to the scale 2 with the single track. Therefore, the optical encoder 1 can improve detection accuracy of the position information while configuring the single compound track of the absolute pattern and the incremental pattern with no omitted scale marks.

(2) There is no need for an individual track for each of the absolute pattern and the incremental pattern, and so the optical encoder 1 can be made smaller and costs can be reduced.

(3) The first scale mark 21 absorbs the first light without causing reflection or refraction, for example, and therefore it is possible to reliably block the first light from being reflected to the image capturer 5. Accordingly, the optical encoder 1 can improve detection accuracy.

(4) The first scale mark 21 has the nano-pattern N that is formed by nanoimprinting, where the nano-pattern N has a structure to block the first light from reflecting to the image capturer 5 and reflect the second light to the image capturer 5, and the first light is the light of the specific wavelength $\lambda$, having the characteristic where, when the predetermined nano-pattern N is interposed, the light is absorbed by the nano-pattern N. Therefore, it is possible to readily form the first scale mark 21 that can block the first light from reflecting to the image capturer 5. In addition, because the nano-pattern N is formed in the first scale mark 21 using nanoimprinting, the nano-pattern N can be formed by transferring without using an exposure apparatus, for example. Accordingly, the present invention can reduce costs.

(5) The light source 4 includes the first light source 41 emitting the light of the predetermined wavelength at the scale, and the second light source 42 emitting light of a wavelength other than the predetermined wavelength at the scale, and thereby the image capturer 5 can capture images of the incremental pattern and the absolute pattern separately, for example. In addition, the first image capturing portion 51 can capture an image of the absolute pattern and the second image capturing portion 52 can capture an image of the incremental pattern reliably at a respective predetermined timing.

Second Embodiment

Figure 6:
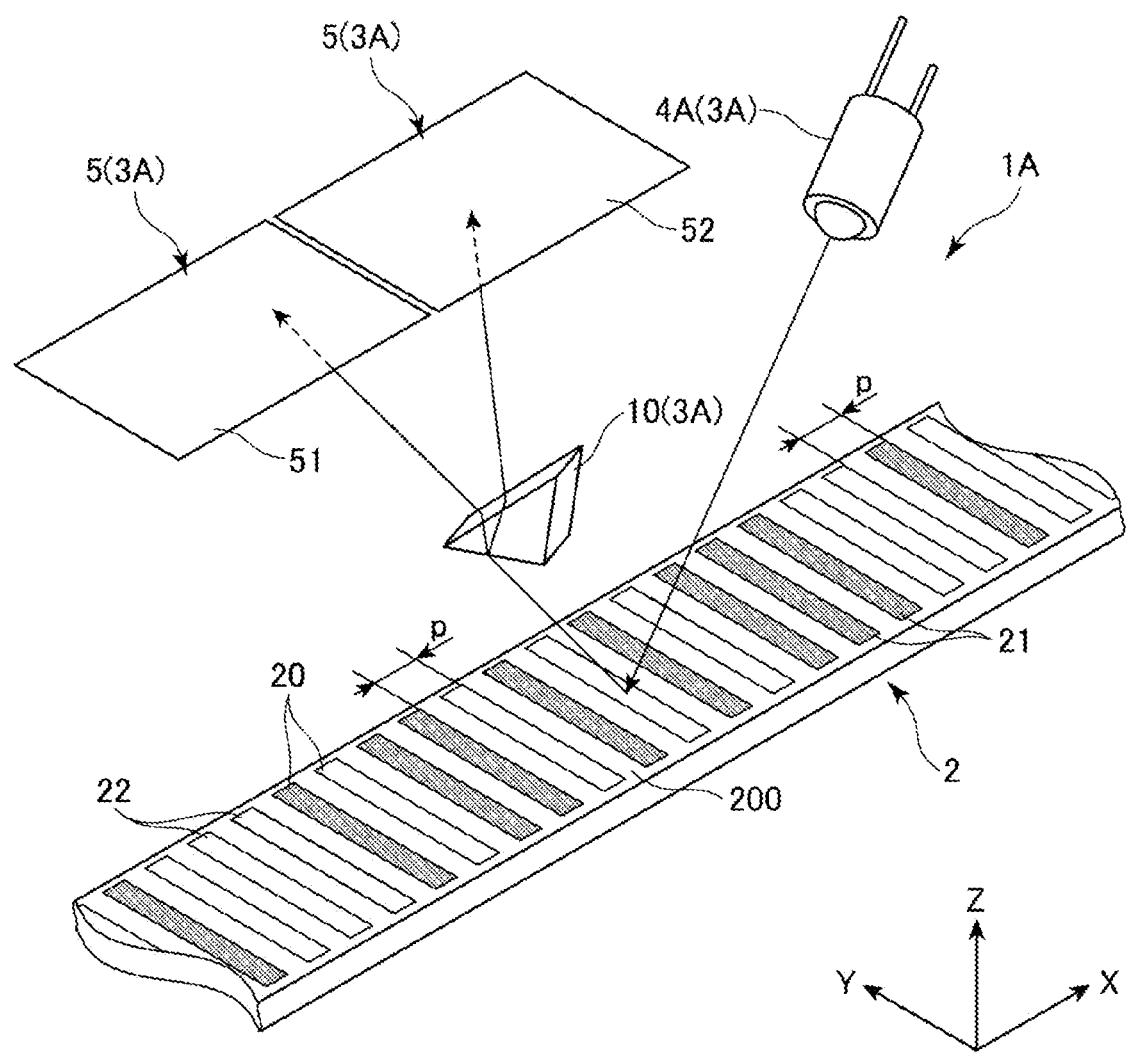
FIG. 6 is a perspective view of an optical encoder according to a second embodiment of the present invention.

Hereafter, a second embodiment of the present invention is described with reference to FIG. 6. In the following description, those portions which have been previously described are assigned identical reference numerals and a description thereof is omitted. FIG. 6 is a perspective view illustrating an optical encoder 1A according to the second embodiment of the present invention. The optical encoder 1A of the second embodiment has a configuration substantially similar to the optical encoder 1 of the first embodiment, except that the optical encoder 1A includes a head 3A.

The head 3 of the optical encoder 1 of the first embodiment includes the light source 4 and the image capturer 5, and as shown in FIG. 1, the light source 4 includes the first light source 41 and the second light source 42. The head 3A of the optical encoder 1A of the second embodiment is different from the first embodiment in that the head 3A further includes a single light source 4A, and a dispersing component 10 that disperses the light from the light source 4A that arrives via the scale pattern 20 into the first light and the second light. The dispersing component 10 is a prism, for example, that disperses the light from the light source 4A that arrives via the scale pattern 20 into the first light which is the light of the specific wavelength and the second light which is the light of a wavelength other than the specific wavelength $\lambda$. In the image capturer 5, the first image capturing portion 51 captures the image of the first light that is dispersed by the dispersing component 10 and the second image capturing portion 52 captures the image of the second light that is dispersed by the dispersing component 10.

In the second embodiment described above, in addition to effects and advantages similar to (1) to (4) according to the first embodiment, the following effects and advantages can also be achieved.

(6) The head 3A includes the dispersing component 10 that disperses the light from the light source 4A that arrives via the scale pattern 20 into the first light and the second light, and therefore the first image capturing portion 51 can capture an image of the absolute pattern and the second image capturing portion 52 can capture an image of the incremental pattern reliably at the respective predetermined timing.

(7) The head 3A includes the dispersing component 10 so the image capturer 5 can capture images of both the incremental pattern and the absolute pattern even when the single light source 4A is used. In addition, the optical encoder 1A can be made smaller since the single light source 4A can be used.

Third Embodiment

Figure 7:
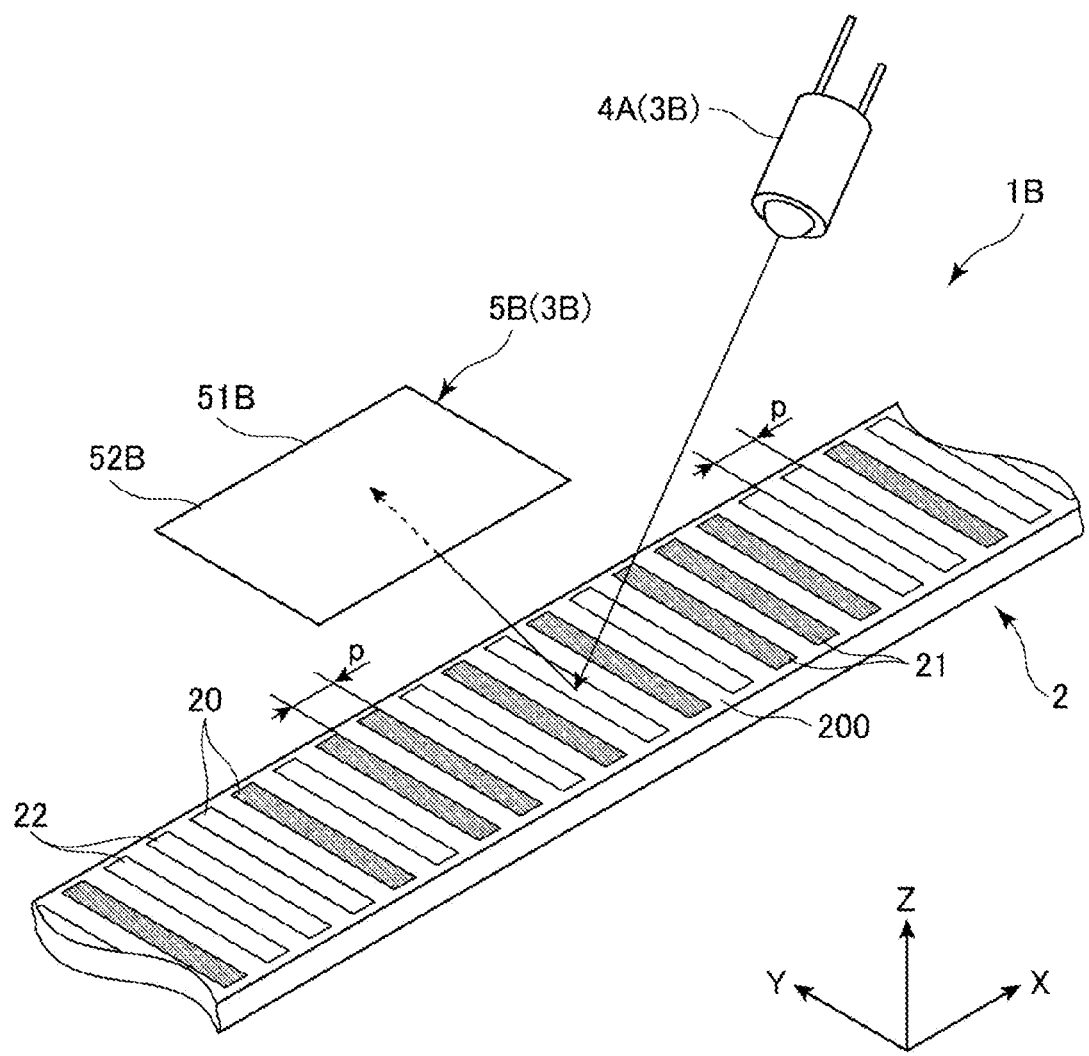
FIG. 7 is a perspective view of an optical encoder according to a third embodiment of the present invention.

Hereafter, a third embodiment of the present invention is described with reference to FIG. 7. In the following description, those portions which have been previously described are assigned identical reference numerals and a description thereof is omitted. FIG. 7 is a perspective view illustrating an optical encoder 1B according to the third embodiment of the present invention. The optical encoder 1B of the third embodiment has a configuration substantially similar to the optical encoder 1A of the second embodiment, except that the optical encoder 1B includes a head 3B.

The head 3A of the optical encoder 1A of the second embodiment includes the single light source 4A and the dispersing component 10 as shown in FIG. 6. The head 3B of the optical encoder 1B of the third embodiment differs from the second embodiment in that the head 3B does not include the dispersing component 10 and in that a first image capturing portion 51B and a second image capturing portion 52B for an image capturer 5B are provided inside the same image capturer 5B and capture images of the light that arrives via the scale 2 by offsetting the image capture timing of each. The first image capturing portion 51B and the second image capturing portion 52B capture the image of the light by offsetting the image capture timing and switching functions, for example. When the first image capturing portion 51B captures an image, the image of the absolute pattern is captured after the function of the second image capturing portion 52B is turned off. When the second image capturing portion 52B captures an image, the image of the incremental pattern is captured after the function of the first image capturing portion 51B is turned off. At this time, the light source 4A may also change the color of the light and the first image capturing portion 51B and the second image capturing portion 52B may capture an image of the absolute pattern or the incremental pattern, based on the different color.

In the third embodiment described above, in addition to effects and advantages similar to (1) to (4) according to the first embodiment, the following effects and advantages can also be achieved.

(8) The first image capturing portion 51B and the second image capturing portion 52B are provided inside the same image capturer 5B and capture images of the light that arrives via the scale 2 by offsetting the image capture timing of each, thus making it possible to save space and reduce costs. In addition, the degree of freedom in designing the optical encoder can be enhanced.

Modifications

Moreover, the present invention is not limited to the above-described embodiments and includes modifications and improvements within a scope capable of achieving the advantages of the present invention. For example, in the embodiments described above, the optical encoders 1, 1A, and 1B are used in a linear scale that serves as a measuring device, but the optical encoder may also be used in another measuring device, such as a dial gauge (test indicator), vernier caliper, or micrometer. That is, an optical encoder is not particularly limited in terms of the form, method, or the like of the measuring device in which it is used and can be used in other measuring devices or the like, as well. The optical encoder of the present invention is not particularly limited in what it can be mounted to. In addition, the optical encoder may be used in a device other than a measuring device such as a sensor.

In the embodiments described above, the optical encoders 1, 1A, and 1B are linear encoders, but the optical encoder may also be a rotary encoder. In the embodiments described above, the calculator 6 is a microcomputer having a processor and a memory that stores a set of instructions executable by the processor for performing the described-herein operations, for example, but the calculator need not be a microcomputer and may instead be, for example, a special purpose computer or personal computer (PC) that that may connected externally. In summary, the calculator only needs to be able to calculate the signal that is based on the relative displacement between the scale and the head.

Figure 8A:
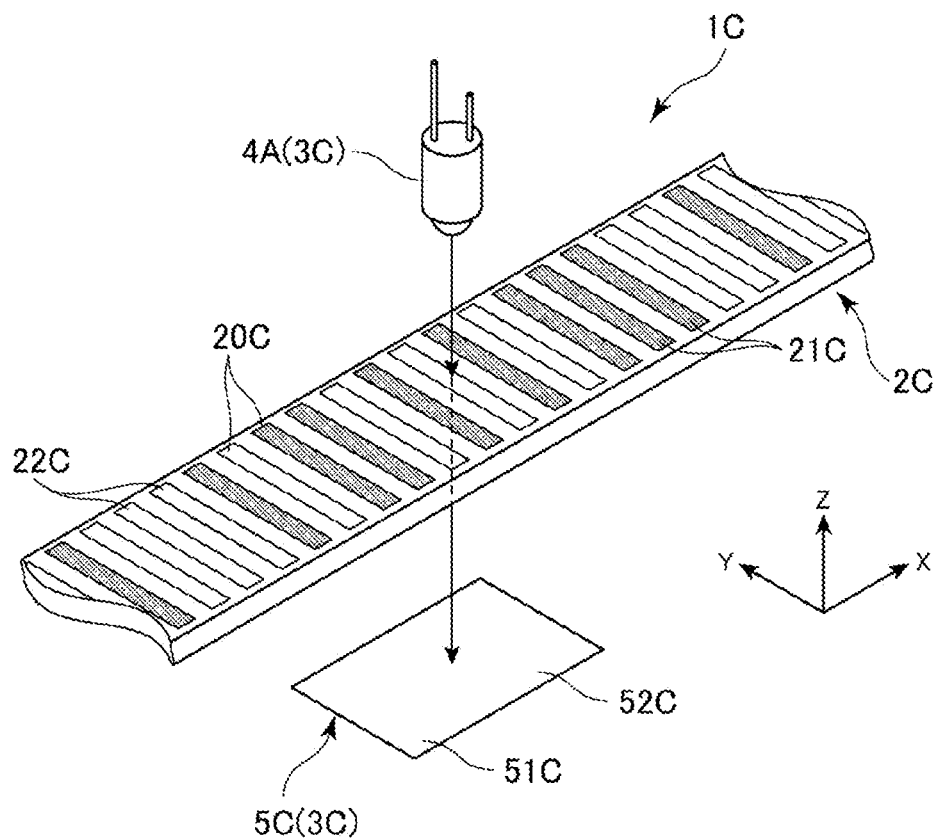
FIGS. 8A and 8B are perspective views of optical encoders according to modifications.
Figure 8B:
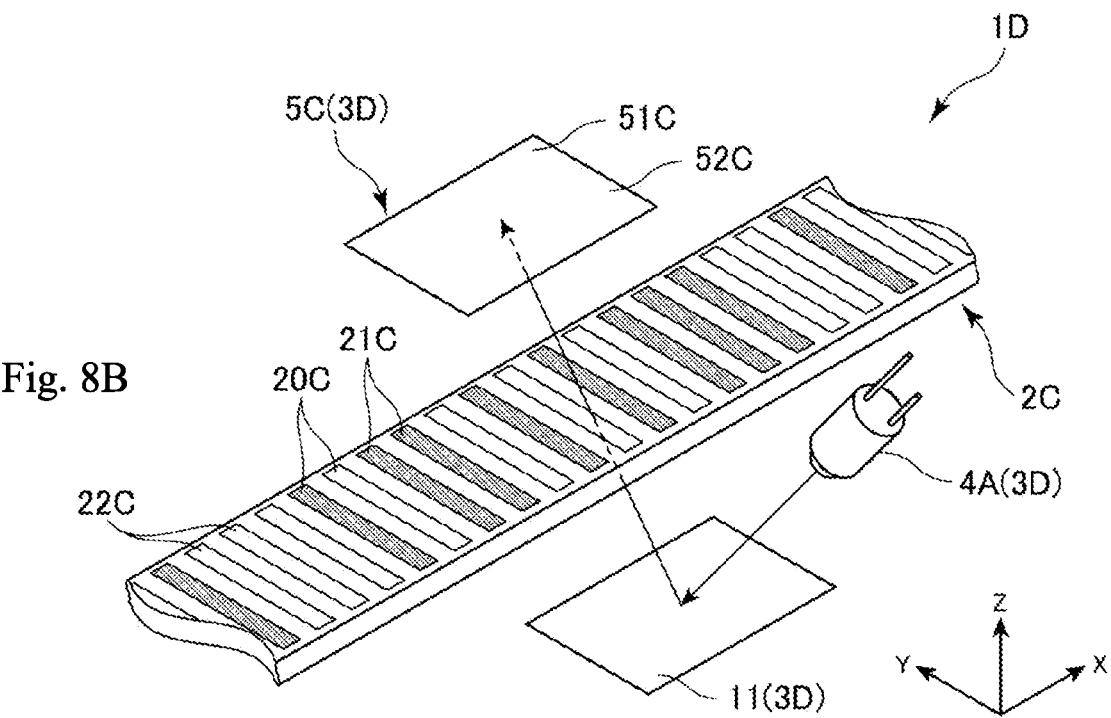

FIGS. 8A and 8B are perspective views of, respectively, optical encoders 1C and 1D according to modifications. Specifically, FIG. 8A illustrates a first modification and FIG. 8B illustrates a second modification. In the embodiments described above, the first scale mark 21 blocks the first light from reflecting to the image capturers 5 and 5B, and reflects the second light to the image capturers 5 and 5B. The second scale mark 22 reflects the first light and the second light to the image capturers 5 and 5B. In the first modification, as shown in FIG. 8A, the optical encoder 1C differs from the embodiments described above in that the optical encoder 1C includes a scale 2C that has a transparent scale pattern 20C and a head 3C that corresponds to the transparent scale 2C. Specifically, a first scale mark 21C blocks transmission of the first light to the image capturer 5 and allows the second light to pass to the image capturer 5C. A second scale mark 22C allows the first light and the second light to pass to the image capturer 5C. The first image capturing portion 51C captures an image of the ABS pattern formed by the first light that passes through the scale 2C and the second image capturing portion 52C captures an image of the INC pattern formed by the second light that passes through the scale 2C.

Further, in the second modification, as illustrated in FIG. 8B, a head 3D of the optical encoder 1D differs from the first modification in that the optical encoder 1D further includes a reflecting component 11 that reflects the light from the light source 4A to the scale 2C. The reflecting component 11 is a mirror, for example, but may be any component that is capable of reflecting light from the light source 4A to the scale 2C. The optical encoder 1D can adjust a emitting direction of the light of the light source 4A by having the reflecting component 11, and therefore, the degree of freedom in designing the optical encoder 1D can be enhanced. Furthermore, the first modification and second modification may include the dispersing component 10 as in the second embodiment, and may be provided with a first image capturing portion and a second image capturing portion that are respectively independent, or may have two light sources as in the first embodiment. Combination of each embodiment and modification is within the scope of a design modification.

In the embodiments described above, the first scale mark 21 absorbs the first light (light of the specific wavelength $\lambda$). However, the first scale mark need not absorb the first light, and may block the first light from being guided to the image capturer using another method, such as reflecting or dispersing the light in a direction that does not affect the image capturer. In addition, the first light need not be the light of the specific wavelength $\lambda$, and may be light of the predetermined wavelength. Further, in the embodiments described above, the nano-pattern N having tiny uneven structures is formed in the first scale mark 21 and the nano-pattern N is formed by nanoimprinting. However, the first scale mark need not be formed by nanoimprinting and instead may be formed by, for example, attaching tiny uneven structures onto a metal film, and need not use a nano-pattern that has uneven structures as a component to block guidance of the first light. In summary, the first scale mark may be configured in any way so long as the first scale mark can block the first light (light of the predetermined wavelength) from being guided to the image capturer and the second light (light of a wavelength other than the predetermined wavelength) can be guided to the image capturer.

As noted above, the present invention can be utilized favorably with an optical encoder.

It is noted that the foregoing examples have been provided merely for the purpose of explanation and are in no way to be construed as limiting of the present invention. While the present invention has been described with reference to exemplary embodiments, it is understood that the words which have been used herein are words of description and illustration, rather than words of limitation. Changes may be made, within the purview of the appended claims, as presently stated and as amended, without departing from the scope and spirit of the present invention in its aspects. Although the present invention has been described herein with reference to particular structures, materials and embodiments, the present invention is not intended to be limited to the particulars disclosed herein; rather, the present invention extends to all functionally equivalent structures, methods and uses, such as are within the scope of the appended claims.

The present invention is not limited to the above described embodiments, and various variations and modifications may be possible without departing from the scope of the present invention.

What is claimed is:

1. An optical encoder comprising:
a scale having a scale pattern provided along a measurement direction;
a head that faces the scale and is displaceable relative to the scale along the measurement direction, the head comprising:
a light source that emits light at the scale, wherein the light emitted from the light source includes a first light that is light of a predetermined wavelength and a second light that is light of a wavelength other than that of the first light; and
an image capturer that captures an image of the light from the light source that is received via the scale pattern; and
a calculator that calculates a signal that is based on the relative displacement between the scale and the head, wherein:
the scale pattern comprises:
a first scale mark that blocks the first light from being guided to the image capturer, and that guides the second light to the image capturer; and
a second scale mark which differs from the first scale mark and guides the first light and the second light to the image capturer,
the second scale mark is arranged along the measurement direction and forms an absolute pattern that expresses an absolute position,
the first scale mark is arranged along the measurement direction and forms an incremental pattern that expresses a relative position by incorporating the absolute pattern created by the second scale mark to combine the first scale mark and the second scale mark,
the image capturer comprises:
a first image capturing section that captures an image of the absolute pattern configured by the first light that arrives via the second scale mark; and
a second image capturing section that captures an image of the incremental pattern configured by the second light that arrives via the first scale mark and the second scale mark, and
the calculator comprises a processor and a memory that stores a set of executable instructions, wherein upon execution of the executable instructions by the processor, the calculator operates as:
an absolute signal generator that generates an absolute signal from the absolute pattern captured by the first image capturing section;
an incremental signal generator that generates an incremental signal from the incremental pattern captured by the second image capturing section; and
a position calculator that calculates a position of the head relative to the scale from the absolute signal and the incremental signal.

2. The optical encoder according to claim 1, wherein the first scale mark blocks the first light from being guided to the image capturer by absorbing the first light, and guides the second light to the image capturer.

3. The optical encoder according to claim 1, wherein:
the first scale mark has a nanoimprinted structure, and
the structure blocks the first light from being guided to the image capturer and guides the second light to the image capturer.

4. The optical encoder according to claim 2, wherein:
the first scale mark has a nanoimprinted structure, and
the structure blocks the first light from being guided to the image capturer and guides the second light to the image capturer.

5. The optical encoder according to claim 1, wherein the second image capturing section captures an image by offsetting an image capture timing from when the first image capturing section captures an image.

6. The optical encoder according to claim 2, wherein the second image capturing section captures an image by offsetting an image capture timing from when the first image capturing section captures an image.

7. The optical encoder according to claim 3, wherein the second image capturing section captures an image by offsetting an image capture timing from when the first image capturing section captures an image.

8. The optical encoder according to claim 4, wherein the second image capturing section captures an image by offsetting an image capture timing from when the first image capturing section captures an image.

9. The optical encoder according to claim 1, wherein the light source comprises:
a first light source that emits light of the predetermined wavelength at the scale, and
a second light source that emits light of a wavelength other than the predetermined wavelength at the scale.

10. The optical encoder according to claim 2, wherein the light source comprises:
a first light source that emits light of the predetermined wavelength at the scale, and
a second light source that emits light of a wavelength other than the predetermined wavelength at the scale.

11. The optical encoder according to claim 3, wherein the light source comprises:
a first light source that emits light of the predetermined wavelength at the scale, and a second light source that emits light of a wavelength other than the predetermined wavelength at the scale.

12. The optical encoder according to claim 4, wherein the light source comprises:
 a first light source that emits light of the predetermined wavelength at the scale, and
 a second light source that emits light of a wavelength other than the predetermined wavelength at the scale.

13. The optical encoder according to claim 5, wherein the light source comprises:
 a first light source that emits light of the predetermined wavelength at the scale, and
 a second light source that emits light of a wavelength other than the predetermined wavelength at the scale.

14. The optical encoder according to claim 6, wherein the light source comprises:
 a first light source that emits light of the predetermined wavelength at the scale, and
 a second light source that emits light of a wavelength other than the predetermined wavelength at the scale.

15. The optical encoder according to claim 7, wherein the light source comprises:
 a first light source that emits light of the predetermined wavelength at the scale, and
 a second light source that emits light of a wavelength other than the predetermined wavelength at the scale.

16. The optical encoder according to claim 8, wherein the light source comprises:
 a first light source that emits light of the predetermined wavelength at the scale, and
 a second light source that emits light of a wavelength other than the predetermined wavelength at the scale.

* * * * *